US011523602B2

(12) United States Patent
Bittner

(10) Patent No.: US 11,523,602 B2
(45) Date of Patent: Dec. 13, 2022

(54) SPRAY BOOM FOR AN AGRICULTURAL MACHINE

(71) Applicant: CNH Industrial America LLC, New Holland, PA (US)

(72) Inventor: Roy A. Bittner, Cato, WI (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 186 days.

(21) Appl. No.: 16/397,133

(22) Filed: Apr. 29, 2019

(65) Prior Publication Data

US 2020/0337291 A1 Oct. 29, 2020

(51) Int. Cl.
*A01M 7/00* (2006.01)
*F16F 1/38* (2006.01)
*F16F 1/373* (2006.01)

(52) U.S. Cl.
CPC ........ *A01M 7/0053* (2013.01); *A01M 7/0071* (2013.01); *F16F 1/3732* (2013.01); *F16F 1/3814* (2013.01); *F16F 2224/025* (2013.01)

(58) Field of Classification Search
CPC ..... A01M 7/0053; A01M 7/0071; B05B 1/20; F16F 1/3732; F16F 1/3814
USPC ................................................. 239/166–168
See application file for complete search history.

(56) References Cited

U.S. PATENT DOCUMENTS

| 3,866,834 | A | * | 2/1975 | Shannon | ............... | A01M 15/00 239/167 |
| 4,106,700 | A | | 8/1978 | Clark | | |
| 4,168,800 | A | | 9/1979 | Quick | | |
| 4,197,999 | A | | 4/1980 | Lammers | | |
| 4,646,972 | A | | 3/1987 | McGregor | | |
| 5,110,174 | A | * | 5/1992 | Andree | ...................... | B60J 1/06 296/77.1 |
| 5,375,767 | A | | 12/1994 | Thorstensson | | |
| 5,794,852 | A | | 8/1998 | Wald et al. | | |
| 6,047,901 | A | | 4/2000 | Pederson et al. | | |
| 6,199,708 | B1 | * | 3/2001 | Monaco | ................... | B61G 9/08 188/284 |
| 7,152,811 | B2 | | 12/2006 | Gunlogson et al. | | |

(Continued)

FOREIGN PATENT DOCUMENTS

JP 5161041 3/2013

OTHER PUBLICATIONS

"System Solutions For Sprayers"; catalog: Hydac International; 11 pages; available at: www.hydac.com%2Ffileadmin%2Fpdb%2Fpdf% 2FPRO000000000000000000010121010011.pdf.

*Primary Examiner* — Christopher S Kim
(74) *Attorney, Agent, or Firm* — Rebecca Henkel; Rickard DeMille

(57) ABSTRACT

The present invention is directed to a spray boom for an agricultural machine in which the boom is arranged as a truss with interior diagonal struts of the truss being configured to absorb tension and compression energy imparted by deflections over the length of the boom with such energy being dissipated as heat. In one aspect, the diagonal strut could comprise a rod moveable with respect to a tube with a polymer, such as an elastomeric material, arranged in the tube to dampen the movement. The tension and compression of the diagonal strut could subject the dampener to a shearing force which could be absorbed by the dampener rather than transferred to the machine.

18 Claims, 6 Drawing Sheets

(56) References Cited

U.S. PATENT DOCUMENTS

| | | | |
|---|---|---|---|
| 7,703,699 B2 * | 4/2010 | Hiddema | A01M 7/0053 |
| | | | 239/167 |
| 7,740,189 B2 * | 6/2010 | Meyer | A01M 7/0053 |
| | | | 239/159 |
| 9,504,211 B2 | 11/2016 | Venton-Walters | |
| 10,085,437 B2 | 10/2018 | Mariani et al. | |
| 2010/0219264 A1 | 9/2010 | Meyer et al. | |
| 2014/0014737 A1 | 1/2014 | Ballu | |
| 2014/0048368 A1 | 2/2014 | Maagaard | |
| 2017/0020121 A1 | 1/2017 | Itou et al. | |
| 2017/0164599 A1 | 6/2017 | Ito et al. | |

\* cited by examiner

SPRAY BOOM FOR AN AGRICULTURAL MACHINE

FIELD OF THE INVENTION

The invention relates generally to agricultural machines, such as self-propelled sprayers and, in particular, to a spray boom for an agricultural machine having upper and lower frame members defining chords of a truss, interior struts between the upper and lower frame members, and at least one diagonal strut between the interior struts which is configured to absorb tension and compression.

BACKGROUND OF THE INVENTION

Agricultural machines, such as self-propelled sprayers, are getting larger to increase operating efficiency, such as by covering more area in a single pass of a spraying session. As spray booms correspondingly get larger, structural materials that are alternatives to steel become more attractive due to their costs, weight and/or stress characteristics. However, no matter the material, long cantilevered beams tend to flex, resulting in energy imparted into the system. Such energy may be transferred to the agricultural machine, causing undesirable resonate deflections. This could cause various problems for the machine, such as adversely impacting the ability to automate height control of the machine. A need therefore exists for an improved spray system that eliminates one or more of the foregoing disadvantages.

SUMMARY OF THE INVENTION

The present invention is directed to a spray boom for an agricultural machine in which the boom is arranged as a truss with interior diagonal struts of the truss being configured to absorb tension and compression energy imparted by deflections over the length of the boom with such energy being dissipated as heat. In one aspect, the diagonal strut could comprise a rod moveable with respect to a tube with a polymer, such as an elastomeric material, arranged in the tube to dampen the movement. The tension and compression of the diagonal strut could subject the dampener to a shearing force which could be absorbed by the dampener rather than transferred to the machine.

In one aspect, a spring and/or dampener system can be used in one or more diagonal boom elements to dissipate energies of deflection to absorb resonance. Spray booms typically comprise truss elements or spars that are rigid in tension and compression. These elements typically pass forces directly from one joint to the next. The present invention introduces dampening to the structure by adding material with hysteresis into some of the elements, such as the diagonals. Loads from bumps in the terrain and/or accelerations from height control cylinders may impart tension and compression forces on the diagonal elements of the truss. The energy imparted on the elements can be absorbed by its hysteretic properties.

In one aspect of a spring and dampening system, a rod can be bonded inside a tube with an elastomeric material. When the tube and rod move relative to each other along their longitudinal axis, the bonding material would be placed in shear, and the energy absorbed. The bonded rod in sleeve can be an affordable manufacturing alternative. It is can also be relatively light in weight, which is an important consideration for a spray boom, and thin in shape so as to avoid producing excessive turbulence when driving through the air near spray nozzles. In one aspect, the dampening could be achieved by a mechanical spring and a hydraulic shock absorber.

Specifically, then, one aspect of the invention can include a spray boom for an agricultural machine, including: an upper frame member defining a top chord of a truss; a lower frame member defining a bottom chord of the truss; first and second interior struts coupled between the top and bottom chords; and a diagonal strut coupled between an upper area of the first interior strut proximal to the top chord and a lower area of the second interior strut proximal to the bottom chord, in which the diagonal strut is configured to absorb tension and compression, and in which at least one of the upper and lower frame members is configured to support multiple spray nozzle assemblies for spraying a liquid product.

Another aspect of the invention can include: a self-propelled agricultural vehicle, including: a chassis supporting a cab and having multiple wheels for moving the vehicle; a liquid product application system supported by the chassis, the liquid product application system comprising a spray boom including: an upper frame member defining a top chord of a truss; a lower frame member defining a bottom chord of the truss; first and second interior struts coupled between the top and bottom chords; and a diagonal strut coupled between an upper area of the first interior strut proximal to the top chord and a lower area of the second interior strut proximal to the bottom chord, in which the diagonal strut is configured to absorb tension and compression, and in which at least one of the upper and lower frame members is configured to support multiple spray nozzle assemblies for spraying a liquid product.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
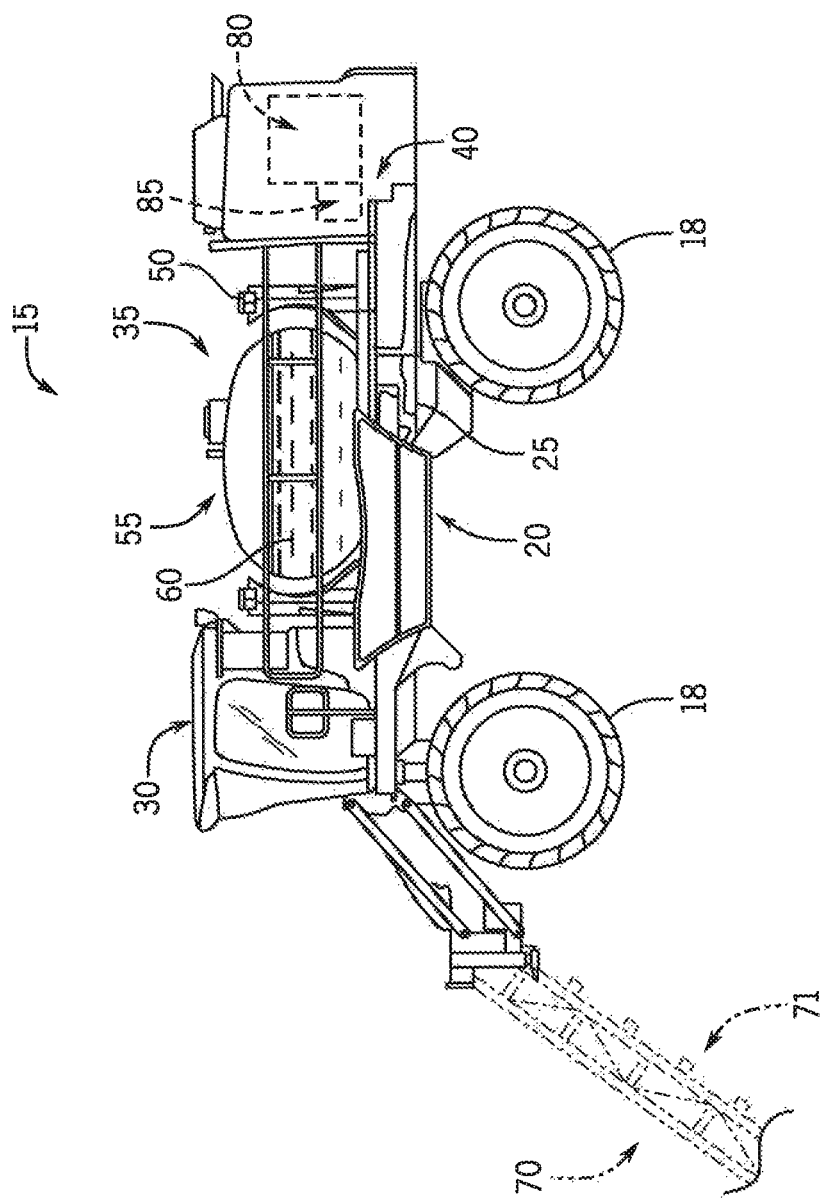
FIG. 1 is a side elevation view of self-propelled off-road agricultural vehicle with a spray boom in accordance with an aspect of the invention.

Referring now to the drawings and specifically to FIG. 1, a spray boom explained in greater detail elsewhere herein is shown for use with an exemplar self-propelled off-road agricultural vehicle. The self-propelled off-road agricultural vehicle is shown here by way of example as a self-propelled sprayer 15. The sprayer 15 is shown as a front-mounted boom self-propelled sprayer such as those available from CNH. Industrial, including the Miller Nitro and the New Holland Guardian Series front-mounted boom sprayers. Although the sprayer 15 is shown as a front-mounted boom self-propelled sprayer, it is understood that self-propelled versions of the sprayer 15 can have either front-mounted, mid-mount, or rear-mounted booms, as well as tiered booms, folding booms and detachable sprayers.

Still referring to FIG. 1, sprayer 15 includes wheels 18 supporting a chassis 20 having chassis frame 25 that supports various assemblies, systems, and components. These various assemblies, systems, and components include a cab 30, and an application system shown as spray arrangement 35, and a hydrostatic drivetrain system 40. Spray arrangement 35 includes storage containers such as a rinse tank 50 storing water or a rinsing solution and a product tank 55 that stores a volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump 36 conveys product 60 from product tank 55 through plumbing components such as interconnected pieces of tubing and through a foldable and height-adjustable spray boom 70 for release out of spray nozzle assemblies 71 that are spaced from each other along the width of the boom during spraying operations of sprayer 15.

Figure 2:
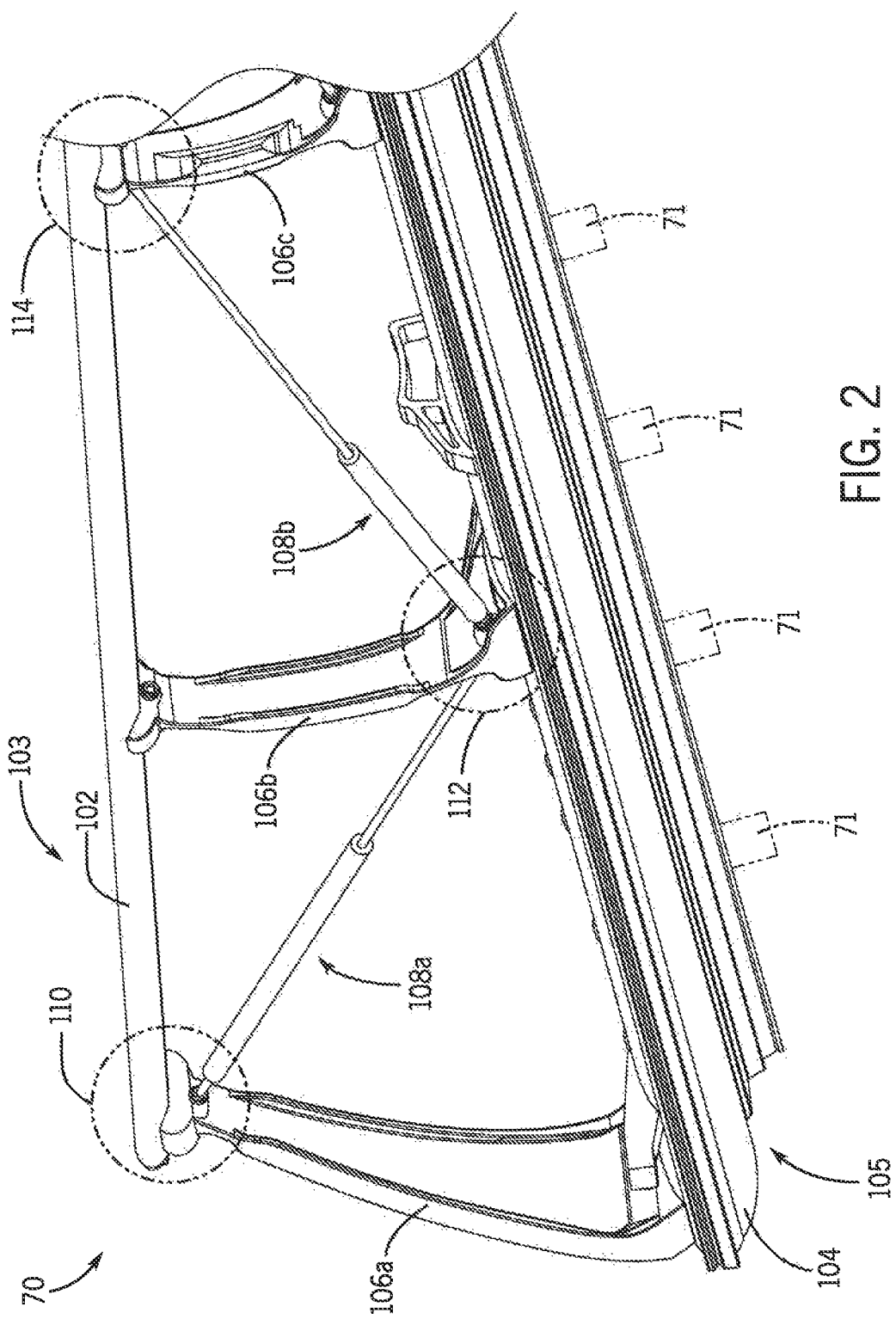
FIG. 2 is an isometric view of an end portion of a spray boom in accordance with an aspect of the invention.

Referring now to FIG. 2, an isometric view of an exemplar end portion of the spray boom 70 is provided in accordance with an aspect of the invention. The boom 70 can include an upper frame member 102 defining a top chord 103 or beam of a truss and a lower frame member 104 defining a bottom chord 105 or beam of the truss. The top chord 103 may typically be in compression while the bottom chord 105 may typically be in tension. For conducting spray operations, at least one of the upper and lower frame members 102 and 104, respectively, can be configured to support a plurality of electronically controlled spray nozzle assemblies 71 for spraying product 60. At least one of the upper and lower frame members 102 and 104, respectively, could be at least 90 feet long, and potentially 180 feet long, from tip to tip, for distributing the spray nozzle assemblies 71 over a wide boom 70 to cover more area of a field in a single pass.

Interior struts 106 or webs can be coupled between the top and bottom chords 103 and 105, respectively. For example, first, second and third interior struts 106a, 106b) and 106c are shown in FIG. 2, interior to, and coupled between, the top and bottom chords 103 and 105, respectively. In addition, diagonal struts 108 can be coupled between upper and lower areas of opposing interior struts 106, proximal to the top and bottom chords 103 and 105, respectively. For example, a first diagonal strut 108a, shown in FIG. 2, can be coupled between an upper area 110 of the first interior strut 106a, proximal to the top chord 103, and a lower area 112 of the second interior strut 106b, proximal to the bottom chord 105. Further, a second diagonal strut 108b, also shown in FIG. 2, can be coupled between the lower area 112 of the second interior strut 106b, proximal to the bottom chord 105, and an upper area 114 of the third interior strut 106c, proximal to the top chord 103. This up/down pattern can repeat along the length of the boom 70, similar to a sawtooth pattern. Accordingly, the boom 70 can be arranged as a truss. However, instead of being rigid in tension and compression, and merely passing forces directly from one joint to the next, the diagonal struts 108 of the present invention can be configured to absorb tension and compression energy imparted by deflections over the length of the boom with such energy being dissipated as heat.

Figure 3:
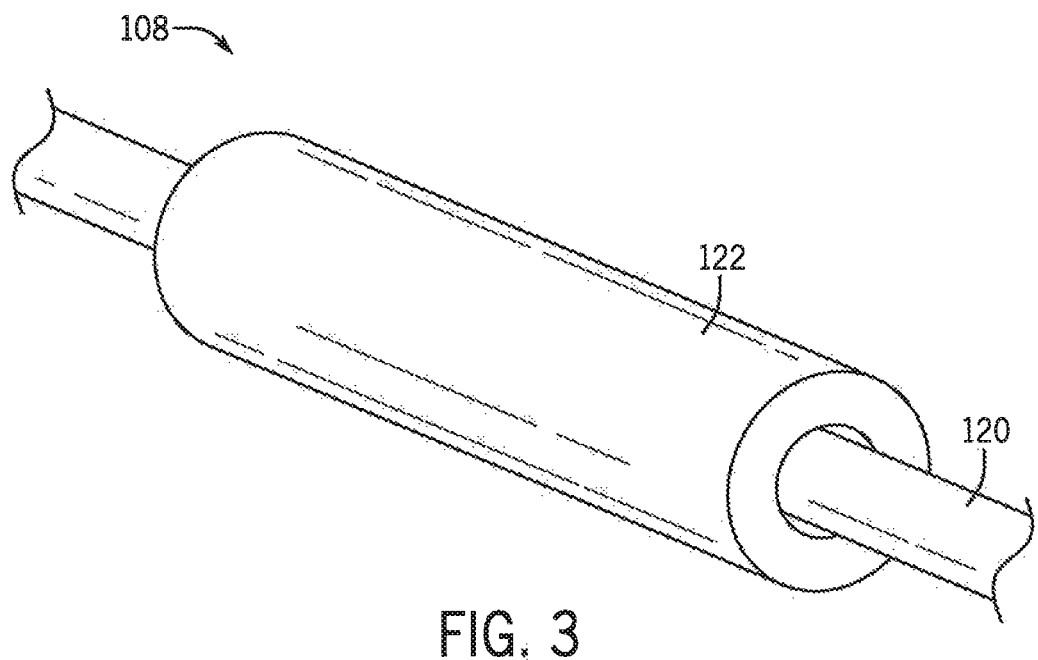
FIG. 3 is an isometric exterior view of a diagonal strut of the spray boom of FIG. 2.
Figure 4:
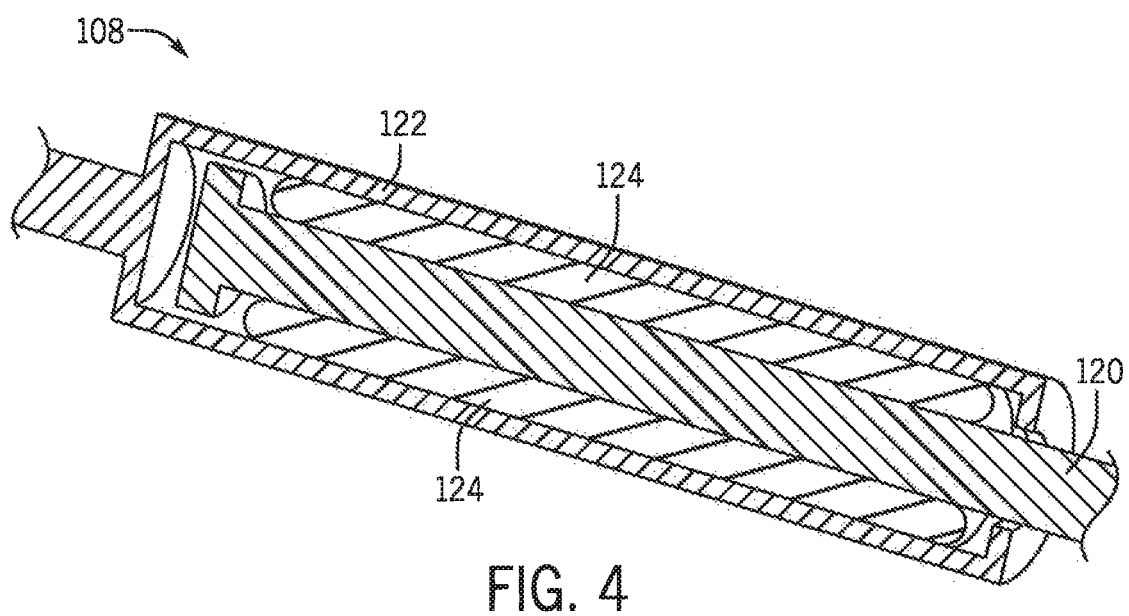
FIG. 4 is an isometric cutaway view of the diagonal strut of FIG. 3.

With additional reference to FIGS. 3 and 4, detailed isometric exterior and cutaway views, respectively of an exemplar diagonal strut 108 is provided in accordance with an aspect of the invention. The diagonal strut 108 can comprise first and second structures 120 and 122, respectively, and a dampener 124 for reducing the amplitude of energy imparted by deflections of the top and bottom chords 103 and 105, respectively. The first structure 120 can be movable with respect to the second structure 122. Also, the dampener 124 can be configured to dampen movement between the structures 120 and 122, respectively. In one aspect, the first and second structures 120 and 122 could comprise a rod and a tube, respectively, in which the rod is movable in and out of the tube. The dampener 124 could comprise a polymer arranged in the tube, such as elastomeric material bonded inside the tube to circumferentially surround the ride. The dampener 124 essentially introduces dampening to the diagonal strut 108 by adding material with hysteresis.

Figure 5:
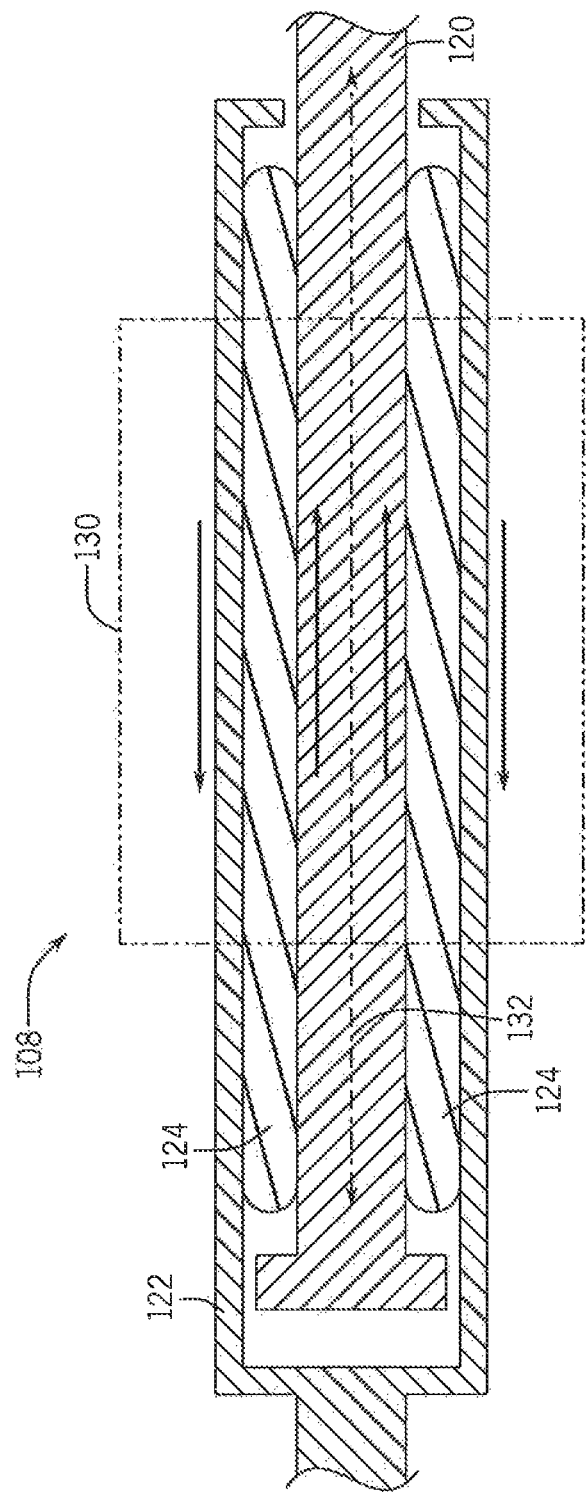
FIG. 5 is a cross sectional cutaway view of the diagonal strut of FIG. 3.

Accordingly, the diagonal strut 108 can dissipate energy imparted by the tension and compression forces it receives, between the top and bottom chords 103 and 105, respectively, as heat. With additional reference to FIG. 5, as illustrated in is a cross sectional cutaway view of the diagonal strut 108, such tension and compression forces can subject the dampener 124 to a shearing force 130 when the tube and rod move relative to each other along a longitudinal axis 132. Shearing forces are unaligned forces pushing one part of a body in one specific direction, and another part of the body in the opposite direction. The shearing force 130 could be absorbed by the dampener 124, rather than be transferred to the sprayer 15. Accordingly, loads from bumps in the field and/or accelerations from height control cylinders of the sprayer 15 may impart tension and compression forces on the diagonal strut 108 which can be absorbed by hysteretic properties of the dampener 124.

In another aspect, a spring and/or dampener system can be used in one or more diagonal struts 108 in combination to dissipate energies of deflection to absorb resonance. For example, the dampening could be achieved by a mechanical spring and a hydraulic shock absorber. Such variations are within the scope of the invention.

Figure 6:
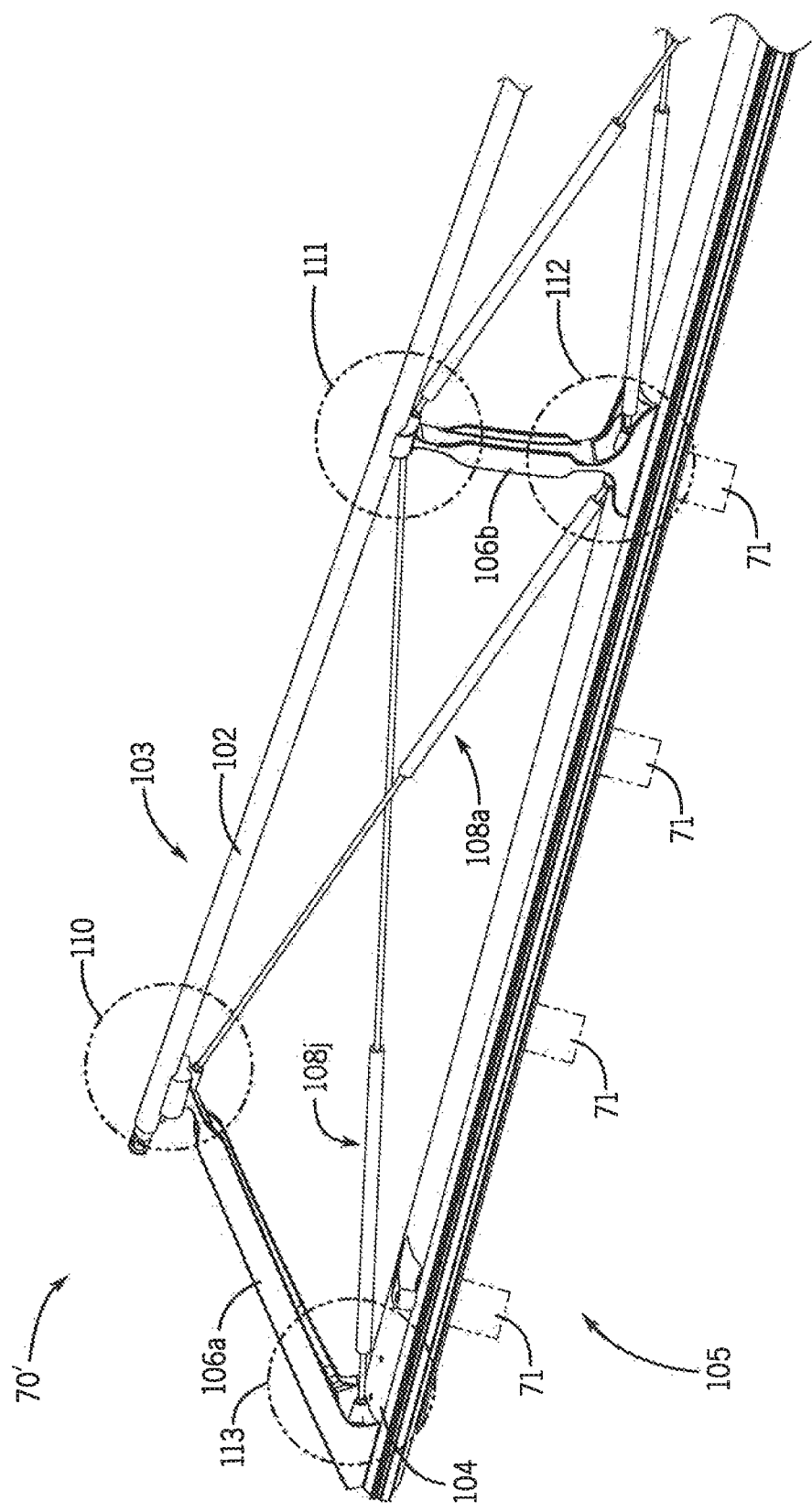
FIG. 6 is an isometric view of an end portion of a spray boom in accordance with an alternative aspect of the invention.

Referring now to FIG. 6, an isometric view of an end portion of a spray boom 70' is provided in accordance with an alternative aspect of the invention where like numerals refer to like parts throughout. In an "X" configuration, multiple diagonal struts 108 can be coupled between upper and lower areas of opposing interior struts 106, proximal to the top and bottom chords 103 and 105, respectively. This can provide even more dampening in the system. For example, in addition to the first diagonal strut 108a, coupled between the upper area 110 of the first interior strut 106a, proximal to the top chord 103, and the lower area. 112 of the second interior strut 106b, proximal to the bottom chord 105, a crossing diagonal strut 108j, coupled between an upper area 111 of the second interior strut 106b, proximal to the top chord 103, and a lower area 113 of the first interior strut 106a, proximal to the bottom chord 105, can be configured. This crossing "X" pattern can repeat along the length of the boom 70.

Figure 7:
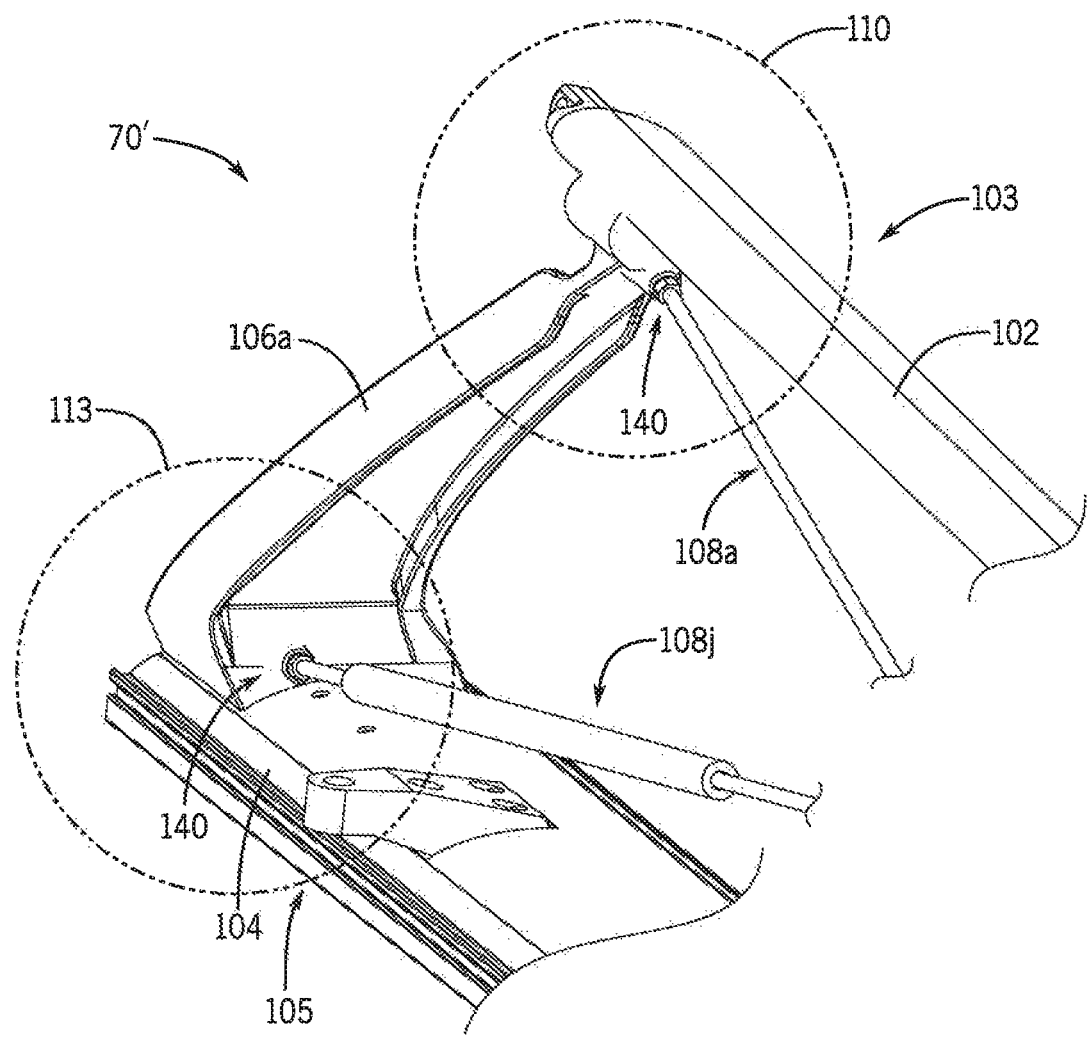
FIG. 7 is an isometric view of a coupling between diagonal struts and an interior strut in the spray boom of FIG. 6.

Finally, with additional reference to FIG. 7, where like numerals refer to like parts throughout, the upper and lower areas of the interior struts 1106 can each comprise a living hinge 140. A living hinge is a thinner flexure bearing made from the same material as the two rigid pieces it connects. It is typically thinned or cut to allow the rigid pieces to bend along the line of the hinge. The living hinge 140 can relieve stress caused by rotational movement between the interior strut 106 and the top chord 103 (such as in the upper area 110) and/or relieve stress caused by rotational movement between the interior strut 106 and the bottom chord 105 (such as in the lower area 113).

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray boom for an agricultural machine, comprising:
an upper frame member defining a top chord of a truss;
a lower frame member defining a bottom chord of the truss;
first and second interior struts coupled between the top and bottom chords and spacing the top and bottom chords a distance apart;
a diagonal strut extending between one end and an opposite end, the diagonal strut positioned to extend diagonally between the top chord and the bottom chord and between the first interior strut and the second interior strut, with the one end of the diagonal strut being connected to an upper area of the first interior strut, the upper area of the first interior strut being closer to the top chord than to the bottom chord, and the opposite end of the diagonal strut being connected to a lower area of the second interior strut, the lower area of the second interior strut being closer to the bottom chord than to the top chord; and
a plurality of spray nozzles positioned on and spaced apart along a length of at least one of the upper and lower frame members, the plurality of spray nozzles being configured to spray a liquid product,
wherein the diagonal strut is configured to absorb tension and compression, and
wherein the diagonal strut comprises a first structure, a second structure, and a damper, wherein the first structure is movable with respect to the second structure, and wherein the damper is configured to damp movement between the first and second structures.

2. The spray boom of claim 1, wherein the first and second structures comprise a rod and a tube, respectively, wherein the rod is movable in and out of the tube.

3. The spray boom of claim 2, wherein the tension and compression of the diagonal strut subjects the damper to a shearing force.

4. The spray boom of claim 2, wherein the damper comprises a polymer arranged in the tube.

5. The spray boom of claim 4, wherein the polymer comprises elastomeric material.

6. The spray boom of claim 1, wherein at least one of the upper and lower frame members is at least 90 feet long.

7. The spray boom of claim 1, wherein the diagonal strut is configured to dissipate energy imparted by the tension and compression as heat.

8. The spray boom of claim 1, wherein the diagonal strut is a first diagonal strut, the spray boom further comprising:
a second diagonal strut extending between one end and an opposing end, the second diagonal strut positioned to extend diagonally between the top chord and the bottom chord and between the first interior strut and the second interior strut, the one end of the second diagonal strut being connected to a lower area of the first interior strut, the lower area of the first interior strut being closer to the bottom chord than to the top chord, and the opposing end of the second diagonal strut being connected to an upper area of the second interior strut, the upper area of the second interior strut being closer to the top chord than to the bottom chord, the second diagonal strut crossing the first diagonal strut to form an X-shaped configuration therewith.

9. The spray boom of claim 1, wherein the upper area of the first interior strut, an upper area of the second interior strut, a lower area of the first interior strut, and the lower area of the second interior strut each comprise a living hinge, the interior struts being connected to the top chord and to the bottom chord by the living hinges, the upper area of the second interior strut being closer to the top chord than to the bottom chord, the lower area of the first interior strut being closer to the bottom chord than to the top chord.

10. A self-propelled agricultural vehicle, comprising:
a chassis supporting a cab and having a plurality of wheels for moving the vehicle;
a liquid product application system supported by the chassis, the liquid product application system comprising a spray boom including:
an upper frame member defining a top chord of a truss;
a lower frame member defining a bottom chord of the truss;
first and second interior struts coupled between the top and bottom chords spacing the top and bottom chords a distance apart;
a diagonal strut extending between one end and an opposite end, the diagonal strut positioned to extend diagonally between the top chord and the bottom chord and between the first interior strut and the second interior strut, with the one end of the diagonal strut being connected to an upper area of the first interior strut, the upper area of the first interior strut being closer to the top chord than to the bottom chord, and the opposite end of the diagonal strut being connected to a lower area of the second interior strut, the lower area of the second interior strut being closer to the bottom chord than to the top chord; and
a plurality of spray nozzles positioned on and spaced apart along a length of at least one of the upper and lower frame members, the plurality of spray nozzles being configured to spray a liquid product,
wherein the diagonal strut is configured to absorb tension and compression, and
wherein the diagonal strut comprises a first structure, a second structure, and a damper, wherein the first structure is movable with respect to the second structure, and wherein the damper is configured to damp movement between the first and second structures.

11. The vehicle of claim 10, wherein the first and second structures comprise a rod and a tube, respectively, wherein the rod is movable in and out of the tube.

12. The vehicle of claim 11, wherein the tension and compression of the diagonal strut subjects the damper to a shearing force.

13. The vehicle of claim 11, wherein the damper comprises a polymer arranged in the tube.

14. The vehicle of claim 13, wherein the polymer comprises elastomeric material.

15. The vehicle of claim 10, wherein at least one of the upper and lower frame members is at least 90 feet long.

16. The vehicle of claim 10, wherein the diagonal strut is configured to dissipate energy imparted by the tension and compression as heat.

17. The vehicle of claim 10, wherein the diagonal strut is a first diagonal strut, the spray boom further comprising:
a second diagonal strut extending between one end and an opposing end, the second diagonal strut positioned to extend diagonally between the top chord and the bottom chord and between the first interior strut and the second interior strut, the one end of the second diagonal strut being connected to a lower area of the first interior strut, the lower area of the first interior strut being closer to the bottom chord than to the top chord, and the opposing end of the second diagonal strut being connected to an upper area of the second interior strut, the upper area of the second interior strut being closer to the top chord than to the bottom chord, the second diagonal strut crossing the first diagonal strut to form an X-shaped configuration therewith.

18. The vehicle of claim 10, wherein the upper area of the first interior strut, an upper area of the second interior strut, a lower area of the first interior strut, and the lower area of the second interior strut each comprise a living hinge, the interior struts being connected to the top chord and to the bottom chord by the living hinges, the upper area of the second interior strut being closer to the top chord than to the bottom chord, the lower area of the first interior strut being closer to the bottom chord than to the top chord.

* * * * *